United States Patent
Reiker

[11] Patent Number: 5,883,331
[45] Date of Patent: Mar. 16, 1999

US005883331A

[54] ELECTRICAL BOX WITH FIXTURE SUPPORT HAVING AN EXTENSION THEREON

[76] Inventor: Kenneth H. Reiker, 269 Country Club Dr., Shalimar, Fla. 32579

[21] Appl. No.: 904,869

[22] Filed: Aug. 10, 1997

Related U.S. Application Data

[63] Continuation of Ser. No. 862,378, May 23, 1997, Ser. No. 862,379, May 23, 1997, Ser. No. 490,757, Jun. 15, 1995, Pat. No. 5,677,512, and Ser. No. 371,695, Jan. 12, 1995.

[60] Provisional application No. 60/023,060, Aug. 2, 1996.

[51] Int. Cl.⁶ .................................................. H01R 13/629
[52] U.S. Cl. .............................. 174/54; 174/61; 248/906; 248/205.3
[58] Field of Search ............................... 174/58, 50, 54, 174/55, 56, 57, 61; 220/3.2, 3.3, 3.7, 3.9; 248/906, 205.3

[56] References Cited

U.S. PATENT DOCUMENTS

| | | | |
|---|---|---|---|
| 1,339,847 | 5/1920 | Harvey | 174/56 |
| 2,031,689 | 2/1936 | Buckels | 248/906 X |
| 2,959,633 | 11/1960 | Palmer et al. | 220/3.2 X |
| 3,168,613 | 2/1965 | Palmer | 174/50 X |
| 3,616,096 | 10/1971 | Roeder | 248/205.3 X |
| 3,740,451 | 6/1973 | Schindler et al. | 220/3.2 X |
| 4,062,512 | 12/1977 | Arnold | 248/906 X |
| 4,331,832 | 5/1982 | Curtis et al. | 220/3.7 X |
| 4,770,311 | 9/1988 | Wang | 220/3.2 X |
| 4,788,383 | 11/1988 | Caison | 248/906 X |
| 4,919,292 | 4/1990 | Hsu | 174/61 X |
| 5,486,650 | 1/1996 | Yetter | 220/3.2 X |

FOREIGN PATENT DOCUMENTS

| | | | |
|---|---|---|---|
| 2436518 | 4/1980 | France . | |
| 446029 | 4/1936 | United Kingdom | 220/3.2 X |
| 1137422 | 12/1968 | United Kingdom | 220/3.7 X |
| 1309950 | 3/1973 | United Kingdom . | |

*Primary Examiner*—Dean A. Reichard
*Attorney, Agent, or Firm*—Shlesinger, Arkwright & Garvey LLP

[57] ABSTRACT

An electrical device mounting assembly includes a box having a top wall and a side wall extending downwardly therefrom for defining a junction box cavity therein. A fixture support is disposed in the cavity adjacent to the side wall. The fixture support includes a bottom plate extending away from the side wall, and a threaded extension disposed on the bottom plate. The fixture support may include a pair of spaced apart fixture supports. Each of the spaced apart fixture supports may be sized for supporting a ceiling fan or a light fixture. An adhesive, such as a piece of double-sided tape, may be provided on the top wall of the junction box. The adhesive assists in the installation of the junction box by adhering the junction box to a support surface for a sufficiently long period of time so that the user may have both hands free for holding fasteners and attaching the fasteners to the support and, thus, supporting the junction box.

24 Claims, 7 Drawing Sheets

6
ELECTRICAL BOX WITH FIXTURE SUPPORT HAVING AN EXTENSION THEREON

CROSS-REFERENCE TO RELATED APPLICATIONS

This application is a continuation of application Ser. No. 08/862,378, filed May 23, 1997, and application Ser. No. 08/862,379, filed May 23, 1997, and application Ser. No. 60/023,060, filed Aug. 2, 1996, and application Ser. No. 08/490,757, filed Jun. 15, 1995, now U.S. Pat. No. 5,677,512 to Reiker, issued Oct. 14, 1997, and application Ser. No. 08/371,695, filed Jan. 12, 1995, each of which is incorporated herein by reference.

This application also relates to four (4) concurrently filed applications 08/905,142; 08/905,141; 08/905,077; and 08/905,691, and each of which was filed on Aug. 1, 1997, each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support for supporting a fixture can be located the proper distance from a second support to meet National Electrical Code (NEC) standards.

Another object of the invention is to eliminate the problem of the upper radius between the top wall and side wall of electrical boxes that prevents fixture supports or studs from being fitted next to the inside face of such side walls.

Another object of the invention is to achieve a strengthened electrical box with a supplemental support within a standard so-called "4x4" box, while maintaining the near universal 3.5 inch (8.9 cm) spacing between the fixture supports so that the box is usable with standard light fixtures, ceiling fans, and the like.

It is likewise an object of the invention to provide supplemental supports in the electrical boxes to enhance the carrying strength of the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of toggle locking or welding or screwing or riveting, yet which do not loosen when subjected to static and/or dynamic loading.

A still further object of the invention is to provide a junction box in which the supplemental support for carrying static and dynamic loads extends from the side walls of the junction box in use thanks to the support being configured for engaging the side wall thereof when the support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly having a top wall and a side wall extending downwardly therefrom for defining a junction box cavity therein. A fixture support is disposed in the cavity adjacent to the side wall. The fixture support includes a bottom plate extending away from the side wall, and a threaded extension disposed on the bottom plate. The fixture support may include a pair of spaced apart fixture supports. Each of the spaced apart fixture supports may be sized for supporting a ceiling fan or a light fixture. An adhesive, such as a piece of double-sided tape, may be provided on the top wall of the junction box. The adhesive assists in the installation of the junction box by adhering the junction box to a support surface for a sufficiently long period of time so that the user may have both hands free for holding fasteners and attaching the fasteners to the support and, thus, supporting the junction box.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

DESCRIPTION OF THE PRIOR ART

Figure 1:
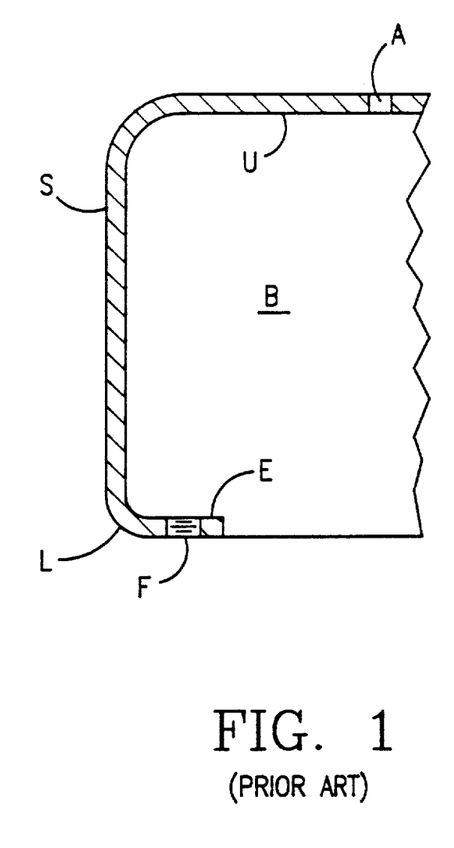
FIG. 1 is a cross sectional view of a PRIOR ART electrical junction box having an inwardly extending ear E with a face plate attachment hole F provided therein.

FIG. 1 shows a PRIOR ART junction box 3 including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes 3 is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many more homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Turning to FIGS. 2–5, a first preferred embodiment of a junction box 10 according to the invention is shown.

Junction box 10 includes a top wall 14, a side wall 18, and a lower free edge or portion 22.

One or more holes 24 may be provided in top wall 14 through which fasteners, such as nails or screws, will be inserted so as to attach junction box 10 to a support surface, such as the lower face of a joist. Additional holes or mounting brackets, may be attached to side wall 18 for securing box 10 to the side face of downwardly extending joist, for example, when box 10 is to be installed on the side of a joist as opposed to the lower face of a joist.

A support assembly 30 is provided for supporting an electrical fixture, such as a light, chandelier, or ceiling fan.

At least one support assembly 30 will be provided. In the illustrated embodiment, a left support assembly is spaced apart from a right support assembly 30, as viewed in FIG. 3, for example.

Figure 4:
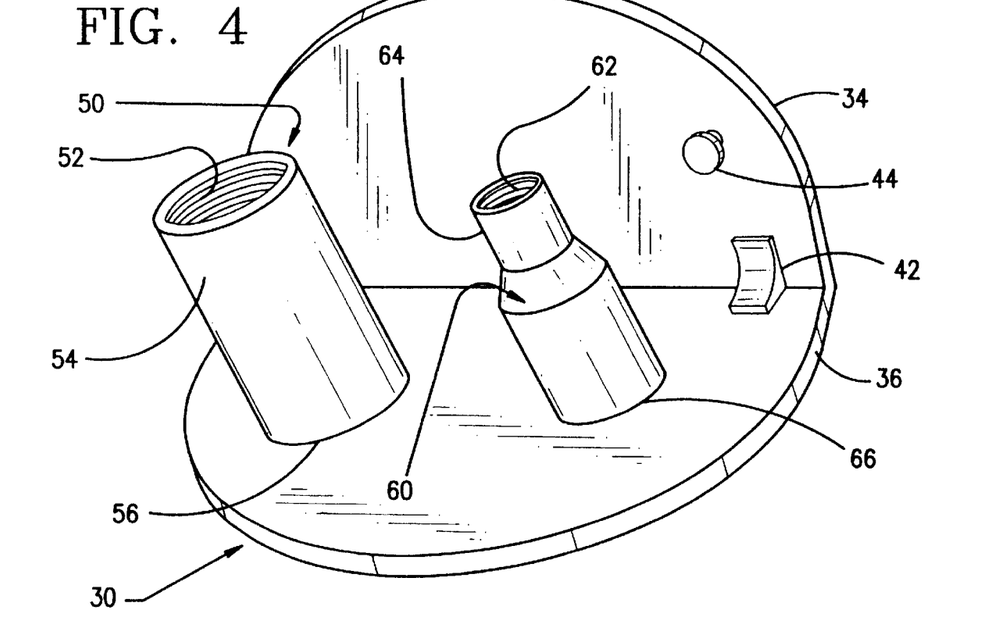
FIG. 4 is a perspective view of the support of FIG. 2 according to the invention, on an enlarged scale.

Support assembly 30 includes an L-shaped bracket 32 having a back support plate 34 and a bottom support plate 36. Bottom plate 36 includes spaced apart holes 37 and 38 extending therethrough One or both of holes 37 and 38 may having internal threads therein.

One or more optional angle strengtheners 42 extend between back support plate 34 and bottom support plate 36. Angle strengtheners 42 increase the carrying strength of bottom support plate 36 and, hence, support assembly 30.

In addition, one or more optional positioning nipples 44 may be provided on back support plate 34. Positioning nipples 44 are useful for ensuring the proper location and disposition of support assembly 30 during fabrication of junction box 10, by making it easier to position back support plate 34 on side wall 18 in the intended location of support assembly 30 relative to bottom portion 22, as will be readily appreciated.

Figure 3:
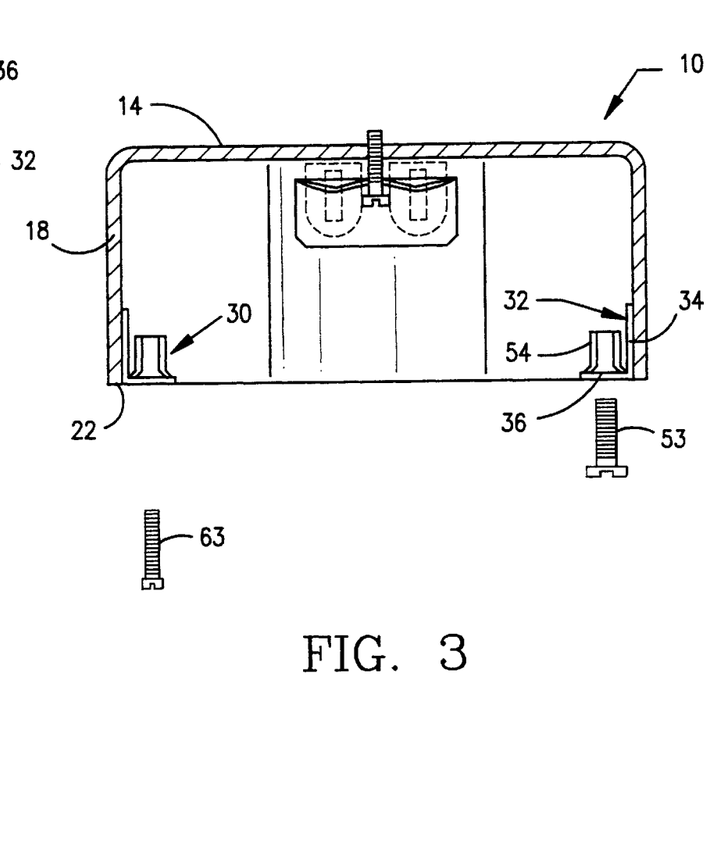
FIG. 3 is a cross-sectional view of the junction box of FIG. 2 according to the invention.

A first fixture support 50, such as for fan support is disposed on bottom support plate 36 and may be labelled "FAN". Fan support 50 includes internal threads 52 provided on outwardly extending upper portion 54. Upper portion 54 is shown as extending upwardly toward top wall 14, although it is contemplated that upper portion 54 may extend downwardly away from top wall 14 and bottom support plate 36, depending on the positioning of L-shape support plate 32.

A base 56 may be provided on the lower end of upper portion 54.

In the illustrated embodiment of junction box 10, with upper portion 54 extending upwardly, internal threads 52 will be provided on a hole which opens toward base 56. Such hole/internal threads 52 align with left or fan support hole 37 in bottom plate 36. Internal threads 52 are preferably selected so as to mate with the typical screws 53 or other male fasteners having external threads that are supplied with conventional ceiling fans, such as 10–32 screws.

Similarly, a second or light fixture or light support 60 is disposed on bottom plate 36, and may be labelled "LIGHT".

Light support 60 includes a hole having internal threads 62, which hole/internal threads 62 are aligned with hole 38 in bottom plate 36. Hole 38 may be provided with threads of the same type as internal thread 62. A base 66 may be provided on a lower portion of upper part 64. As will be readily appreciated, in the illustrated embodiment, base 66 will likewise have a through hole therein for communicating hole 38 with internal thread 62.

Preferably, internal thread 62 has a thread size corresponding to the threads of conventional light fixture support screws 63 or other light fixture support fasteners having male threads thereon, such as conventional 8–32 screws.

Figure 11:
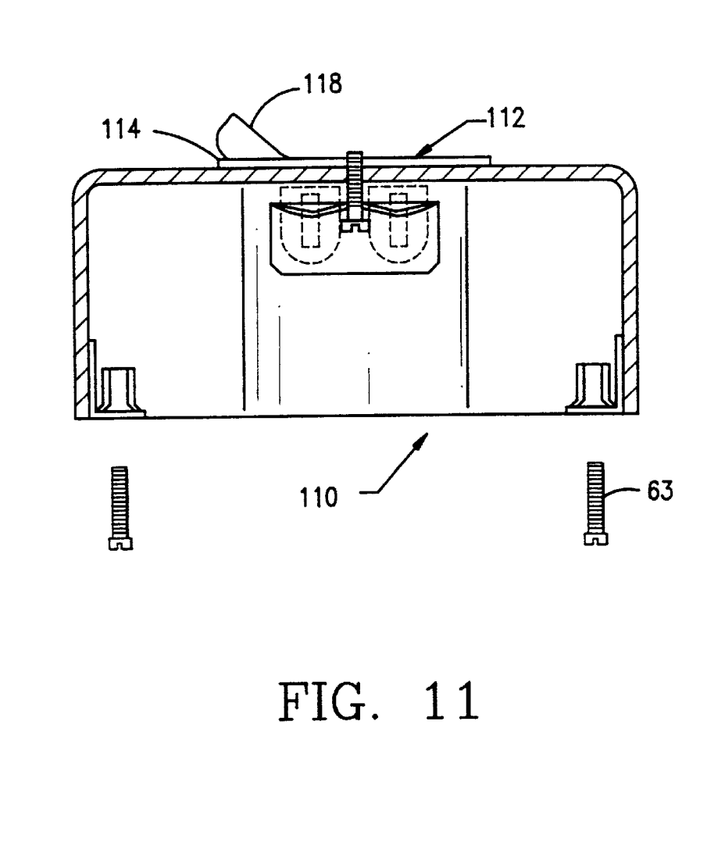
FIG. 11 is a cross-sectional view of the box of FIG. 10.

Needless to say, screws 53 and 63 of FIG. 3 are for illustrative purposes only, and would typically be used in pairs of the same type of screw 53 or 63, as shown in FIG. 11 below.

FIGS. 6–9 illustrate a further preferred embodiment of a junction box 80 according to the invention.

Junction box 80 includes at least one support assembly 84. A second, spaced apart support assembly 84 may be provided on an opposite side of junction box 80.

Figure 8:
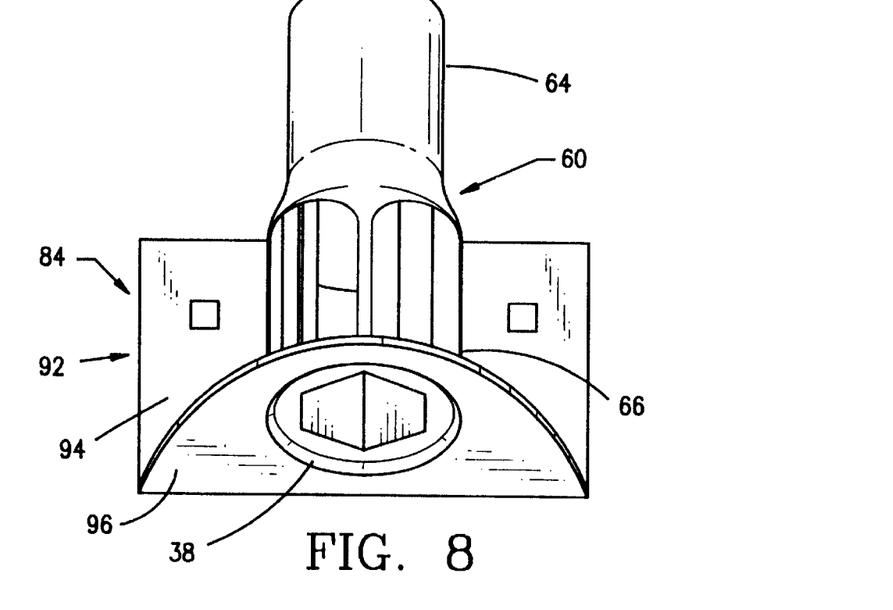
FIG. 8 is a perspective view of the support of FIG. 6, on an enlarged scale.

Support assembly 84 includes an L-shaped bracket 92 having a back support plate 94 and a bottom plate 96 with a hole 98 extending there through. Hole 98 may be threaded depending on the intended use.

Junction box 80 may be provided with a fixture support such as the illustrated light fixture support 60, or with fan support 50. Fan support 50 and light support 60 may be constructed as described above regarding junction box 10 of FIGS. 2–5.

Figure 6:
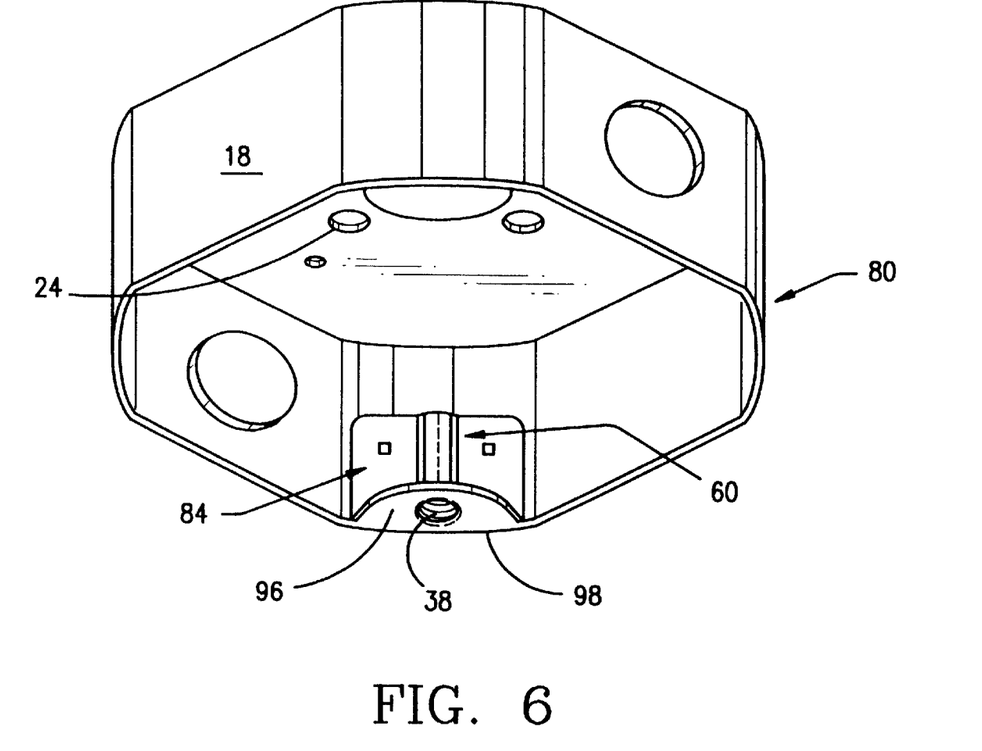
FIG. 6 is a perspective view similar to FIG. 2 of a further preferred embodiment of a junction box.
Figure 7:
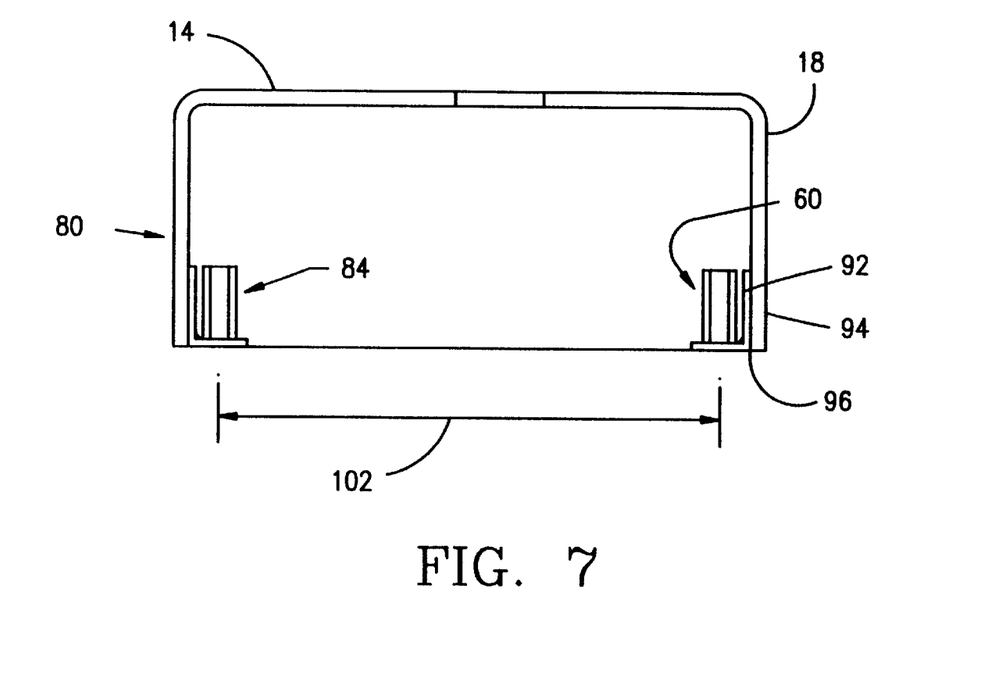
FIG. 7 is a cross-sectional view of the junction box of FIG. 6 according to the invention.

In the case where light support 60 is used, two (2) light supports 60 will be provided on opposite sides thereof, in most cases, as opposed to having fan support 50 on one side and light support 60 on the other side.

L-shaped bracket 32 may be used instead of or in conjunction with L-shaped bracket 92.

Figure 9:
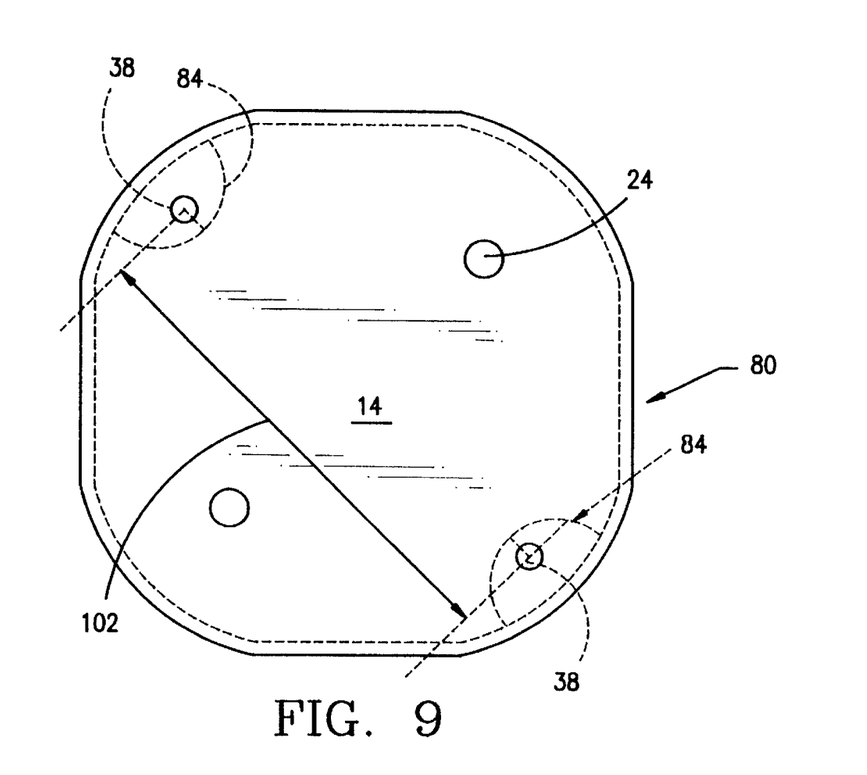
FIG. 9 is a top plan view of the box of FIG. 6.

A center-to-center offset 102 between holes 98 and, hence, internal threads 62 of light support 60 may conveniently be set at 3.5 inches, which is a standard spacing for light fixtures and ceiling fan attachment locations.

Conveniently, the illustrated paired fixture supports 84 mar be supplemented by the addition of paired fan supports. Such paired fan supports may be disposed adjacent to or in between the paired fixture supports 84. In that manner, the user may use the same box for mounting a fan, or, by selecting the spaced apart light fixture support, may mount a light. Such likewise saves on inventory. Quite simply, if the illustrated fan supports are considered to be located at the free ends of a negative sign ("–"), the additional, unillustrated pair of spaced opposed fan or light fixture supports could be considered to be at two of the opposite free ends of a plus sign ("+") while another pair of fixture supports is located at the other free ends of the "plus" sign.

Figure 2:
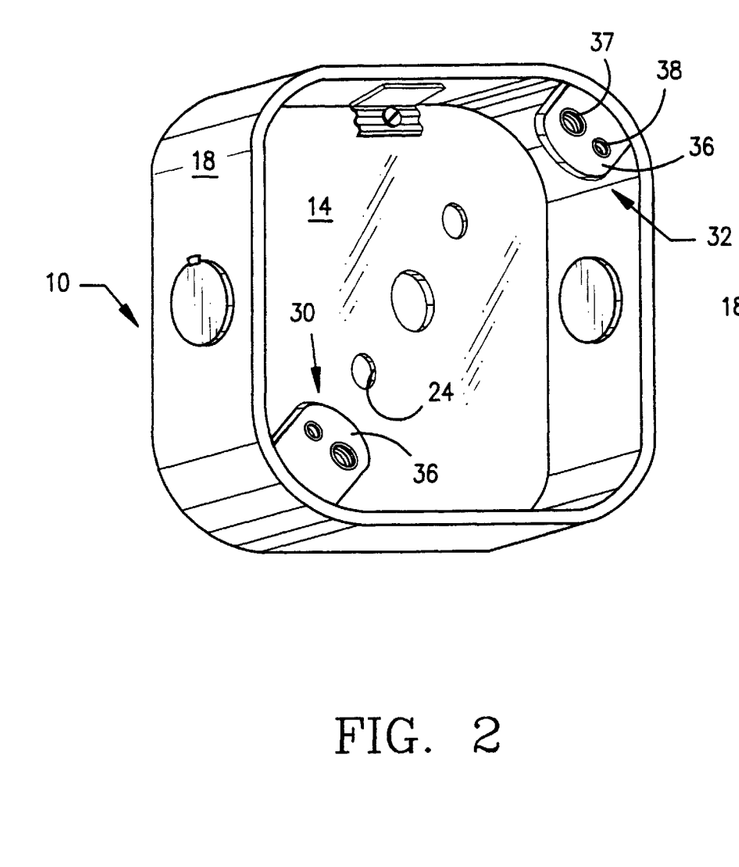
FIG. 2 is a perspective view of a preferred embodiment of an electrical junction box according to the invention.

Such pairing of offset opposed (or adjacent) as in the FIG. 2 embodiment pairs of light and fan supports may be added to any of the other disclosed embodiments of the invention.

Figure 10:
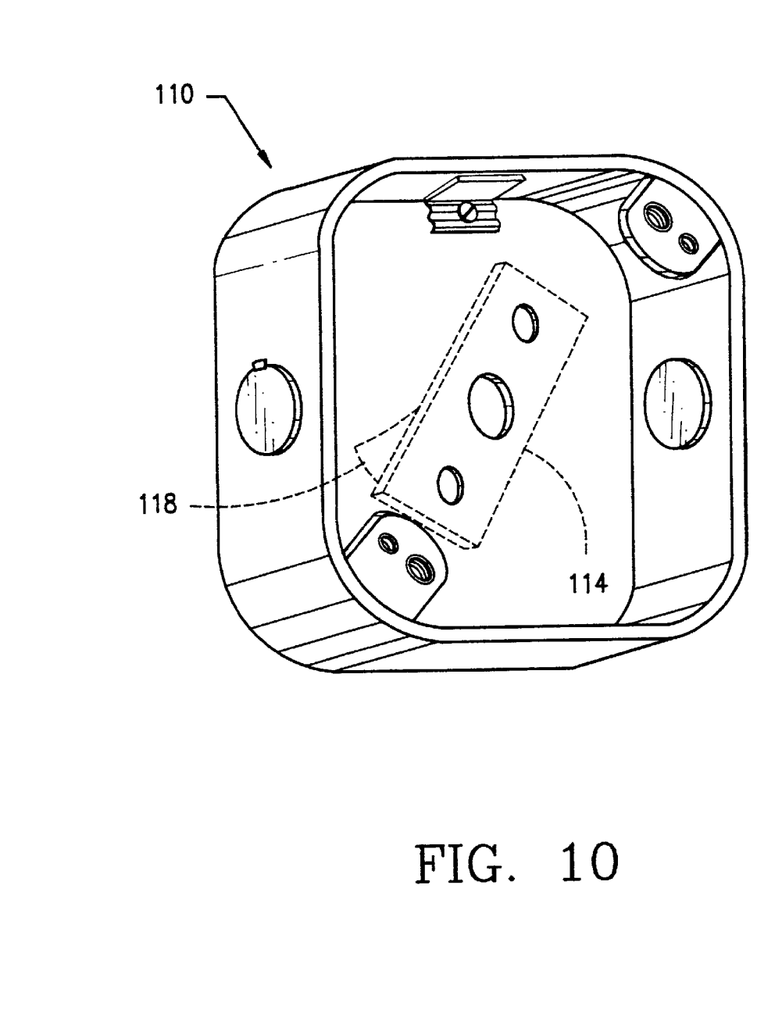
FIG. 10 is a perspective view of a box according to a further preferred embodiment according to the invention.
Figure 12:
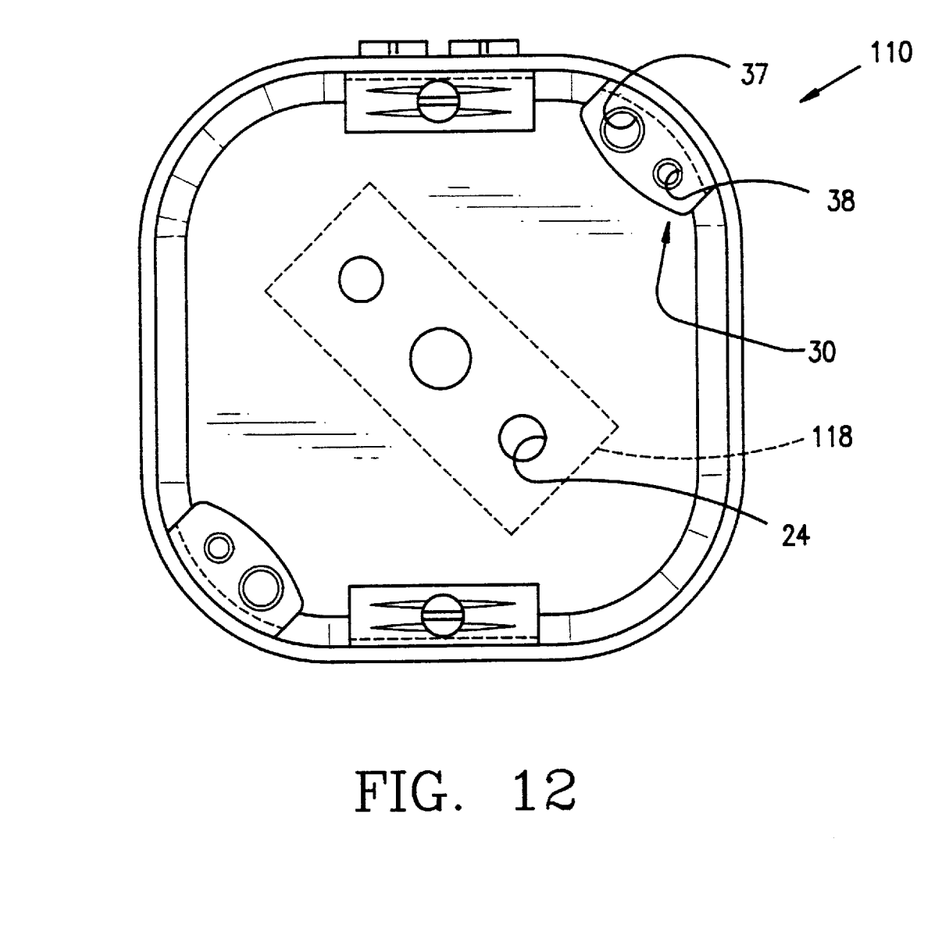
FIG. 12 is a bottom plan view of the box of FIG. 10.

FIGS. 10–12 illustrate a still further embodiment of a junction box 110 according to the invention.

Junction box 110 is similar to junction box 10 of FIGS. 2–5, with the addition of an adhesive 112 to top wall 14 thereof.

Adhesive 112 may be provided in the form of a piece of double-sided tape 114, as shown. Double-sided tape 114 may be provided with a conventional protective layer 118 on the top thereof. Protective layer 118 is engineered to be readily removed from tape 114 just prior to use and prevents tape 114 from adhering to unintended objects and surfaces during shipment, storage and handling thereof.

Double-sided tape 114 may be adhered to top wall 14 by having previously removed a second protective layer 118 disposed on the opposite side of adhesive tape 114 and using the adhesive of adhesive tape 114 to attach adhesive 112 to top wall 14, as will be readily appreciated.

Alternative means for adhering junction box 90 to a surface may be used, such as spray-on adhesive, a piece of putty and other adhering means. Such adhesives are described in my earlier U.S. patent application Ser. No. 08/490,757, filed Jun. 15, 1995, and Ser. No. 08/371,695, filed Jan. 1, 1995, each of which is incorporated herein by reference, and may be utilized in conjunction with or instead of the double-sided tape 114.

FIG. 11 is a cross-sectional view and FIG. 12 is a bottom plan view of junction box 110 of FIG. 10 showing a preferred disposition of adhesive 112. As can be seen, adhesive/adhesive tape 114 may be placed in line with fastener holes 24, for example. Such disposition of adhesive tape 114 guides the user in placement of junction box 110 on the lower face of a ceiling joist so that fastener holes 24 are in place for receiving a screw, nail, or other fastener therethrough for attaching junction box 110 to such ceiling joist.

It will be appreciated that the use of adhesive 112 on top wall 14 may be carried out with any of the preferred embodiments of the invention and variations thereof in accordance with the specification and claims.

OPERATION

Although use of the various embodiments according to the invention is likely readily apparent to a person having ordinary skill in the art, such will be briefly described.

Junction box 10 of FIGS. 2–5 is used as follows.

The user decides whether to install a light or a ceiling fan, for example. In the case where the user wants to install a ceiling fan on the lower face of an existing ceiling joist, essentially the following steps are followed.

The installer aligns one or more holes 24 with the lower face of the ceiling joist, and drives screws or hammers nails there-through to attach box 10 to the ceiling joist.

Figure 5:
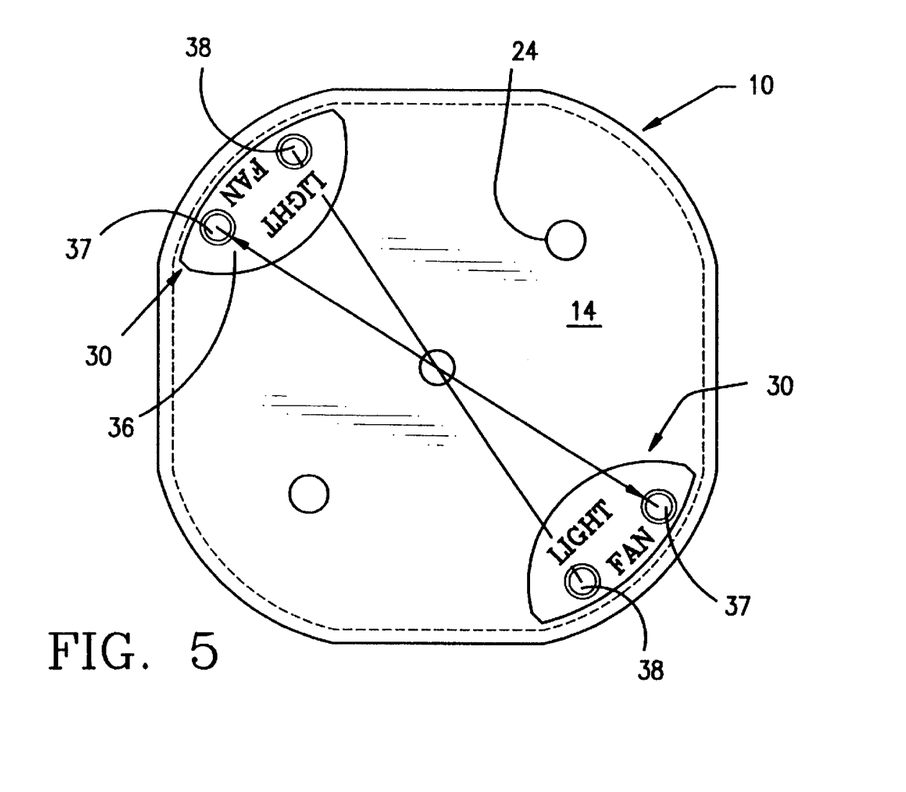
FIG. 5 is a bottom plan view of the box of FIG. 2.

Then the user ensures that the male threads of the fixture support fasteners that are typically provided with the ceiling fan mate with internal threads 52 of fan support 50 by inserting such supplied fasteners through holes 37. Such holes may be conveniently labelled "FAN" as illustrated in FIG. 5. If the supplied fasteners fail to properly engage with internal thread 52 for some reason, the user checks to determine whether fixture fasteners have been taken from the ceiling fan package, or whether the fasteners supplied with the ceiling fan mate with internal threads 62 of light support 60 by inserting such supplied fasteners through hole 38. If the supplied fasteners do not mate with threads 52, correct fasteners should be obtained.

Once the correct fasteners and/or holes 37, 38 have been selected, the user holds the ceiling fan mounting elements in position adjacent opposed holes 37, and confirms the ceiling fan mounting bracket or the like has the expected fastener spacing. After ensuring that all connections are proper, the user wires the fan to standard wiring which has been run into the inside of box 10, securely mounts the fan mounting assembly, and the mounting is complete.

In the case of mounting a light fixture, the user typically will use light support 60 labelled "LIGHT" and follow the steps outlined in the preceding paragraphs.

Junction box 80 of FIGS. 6–9 is installed in a similar fashion to junction box 10.

Junction box 110 of FIGS. 10–12 is installed by removing protective layer 118, orienting adhesive tape 114 to align with the lower face of a ceiling joist, for example, and then pushing box 110 upwardly for adhering adhesive tape 114 against the joist.

Good results have shown that relatively little upward force is necessary for adhering adhesive tape 114 to a ceiling joist so that adhesive tape 114 adheres junction box 110 to the ceiling joist for a sufficiently long period of time so that the user may locate a fastener, such as a nail, locate a tool, such as a hammer, to attach the nail, and then hammer the nail through fastener holes 24. In that manner, the user has both of his/her hands free for holding the nail and wielding the hammer (or holding a screw and operating a power drill or using a screw driver).

Not only has safety been increased, owing to the user having both hands free for installation of junction box 110, but the speed of installation has been increased many times while improving the correct installation of junction boxes.

It is contemplated that L-shaped brackets 32 will be made as unitary pieces, or with joined back support plate 34 and bottom support plates 36, with or without optional angle strengtheners 42.

It is further contemplated that L-shaped bracket 32, and the other disclosed L-shaped brackets, will be attached to respective side walls 18 of junction boxes 10, 80 and 110, by one or more of welding and/or mechanical fastening means such as fasteners and the crimping together of metals from side wall 18 and back support-plate 34 by techniques such as "toggle locking" the two (2) plates together.

It will be appreciated that in all the disclosed embodiments, thanks to the use of upper portions 54 and 64, as well as the overall lengthening of the connection between the fixture fastener and the junction box, increased holding strength and length has been achieved. Such added length eases the tapping of the internal threads on the supports, and serves to protect the threads on the supports.

The elongated connection between the junction boxes and the fixture fasteners has been made even longer by the use of elongated upper portions 54 and 64, which upper portions 54 and 64 have achieved the object of protecting the plastic coating of conventional plastic-coated wiring from exposed male threads inside the junction box cavity.

Fan supports 50 and 60 may be single drawn or stamped.

The use of toggle locking the back plates of the fixture supports to the side walls of the boxes eliminates the relatively expensive step of welding such to the side walls.

It is likewise contemplated that the fixture supports, such as fan support 50 and light support 60 may extend outwardly away from the box cavity, depending on the intended use.

It is likewise contemplated that fan support 50 and/or light support 60 will be installed "upside down" as compared with the illustrated embodiments.

The location of the fixture supports relative to the bottom portion or free edge 22, for example, of the junction box may likewise be varied, and may even be substantially up against top wall 14 of the junction box, depending on the intended use.

There may likewise be provided an upper portion 54 and 64 both above and below an outwardly extending bottom support plate 36, depending on the intended use.

Needless to say, the disclosed connections and configurations act to restrict all movements between supports 50 and 60 and the remainder of the boxes.

By restricting movement of supports 50 and 60, there is achieved the desired predictability of where the lower portion of female threads 37 and 38, for example, are located so that the desired spacing between a left hand one of supplemental support 60 and a right hand one of supplemental support 60 is achieved. Typically, the spacing between the commonly provided two (2) female threads of left and right ones of the fixture supports as shown in the side views of FIGS. 9 and 11, for example, will be achieved. Known light fixtures, for example, are provided with respective left and right male fasteners, three-one half (3½) inches on center, which will be mated with such left and right female fasteners, during final use of the illustrated junction boxes.

All the advantages described regarding the stabilizing of fasteners 53 and 63 and, hence, the supplemental supports, relative to the remainder of junction box, hold true for all the other preferred embodiments of the invention.

As to supplemental supports, such as the illustrated supports 60 and 50, for example, it is likewise contemplated that such supplemental supports will have fully round cylindrical shapes, hexagonal-shapes, square shapes, shapes which are tapered at an upper portion thereof. In addition, frustrums of pyramids and the other shapes are contemplated with truncation taken at angles other than the illustrated angles.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. An electrical device mounting assembly, comprising:
   a) a box including a top wall and a side wall;
   b) said side wall extending downwardly away from said top wall and defining a cavity therein;
   c) a fixture support disposed in said cavity;
   d) said fixture support being disposed adjacent said side wall;
   e) said fixture support including a bottom plate extending away from said side wall;
   f) a hole being provided on said bottom plate; and
   g) a threaded extension disposed on said bottom plate, said threaded extension including an outwardly flared portion disposed adjacent to and aligned with said hole.

2. A mounting assembly as defined in claim 1, wherein:
   a) said fixture support includes a pair of spaced opposed fan supports disposed on opposed sides of said box; and
   b) said fixture support includes a pair of spaced opposed light fixture supposrts sidposed on opposed sides of said box.

3. A mounting assembly as defined in claim 2, wherein:
   a) each one of said spaced opposed light fixture supports is disposed adjacent said pair of spaced opposed ceiling fan supports.

4. A mounting assembly as defined in claim 1, wherein:
a) said bottom plate extends inwardly into said cavity.

5. A mounting assembly as defined in claim 1, wherein:
a) said threaded extension extends upwardly away from said bottom plate.

6. A mounting assembly as defined in claim 1, wherein:
a) said fixture support includes an L-shaped bracket.

7. A mounting assembly as defined in claim 1, wherein:
a) said hole includes a threaded hole sized for mating with a ceiling fan fastener.

8. A mounting assembly as defined in claim 7, wherein:
a) said threaded extension 23 extends upwardly away from said bottom plate.

9. A mounting assembly as defined in claim 1, wherein:
a) an adhesive is disposed on one of said top wall and said side wall of said box; and
b) said adhesive includes a piece of double-sided tape.

10. A mounting assembly as defined in claim 1, wherein:
a) said fixture support includes a ceiling fan support and a light fixture support.

11. A mounting assembly as defined in claim 1, wherein:
a) said fixture support includes a first fixture support and a spaced apart second fixture support disposed on an opposed face of said box.

12. A mounting assembly as defined in claim 11, wherein:
a) said fixture support includes a ceiling fan support disposed on at least one of said first and second spaced opposed fixture supports.

13. A mounting assembly as defined in claim 12, wherein:
a) a light fixture support is disposed adjacent to said ceiling fan support on at least one of said spaced opposed fixture supports.

14. A mounting assembly as defined in claim 1, wherein:
a) an adhesive is disposed on one of said top wall and said side wall of said box.

15. A mounting assembly as defined in claim 14, wherein:
a) said adhesive is disposed on said top wall of said box.

16. An electrical device mounting assembly, comprising:
a) a box including a top wall and a side wall;
b) said side wall extending downwardly away from said top wall and defining a cavity therein;
c) a fixture support disposed in said cavity;
d) said fixture support being disposed adjacent said side wall;
e) said fixture support including an L-shaped bracket, said L-shaped bracket having a back support plate and a bottom plate, said back support plate extending along said side wall, and said bottom plate extending away from said back support plate and from said side wall;
f) a threaded extension disposed on said bottom plate; and
g) a strengthening element disposed adjacent an intersection defined by said bottom plate and said back support plate.

17. A mounting assembly as defined in claim 16, wherein:
a) said bottom plate extends inwardly into said cavity.

18. A mounting assembly as defined in claim 16, wherein:
a) an adhesive is disposed on one of said top wall and said side wall of said box.

19. A mounting assembly as defined in claim 16, wherein:
a) a threaded hole is provided on said bottom plate and is aligned with said threaded extension.

20. A mounting assembly as defined in claim 19, wherein:
a) said threaded extension includes a through hole.

21. A mounting assembly as defined in claim 16, wherein:
a) said strengthening element is disposed directly adjacent to said intersection defined by said bottom plate and said back support plate.

22. A mounting assembly as defined in claim 16, wherein:
a) said strengthening element is fixedly attached to said bottom plate and said back support plate.

23. A mounting assembly as defined in claim 16, wherein:
a) said strengthening element is substantially L-shaped.

24. A mounting assembly as defined in claim 1, wherein:
a) said outwardly flared portion has a width, said bottom plate has a width, and said width of said outwardly extending portion is less than the width of said bottom plate.

\* \* \* \* \*

UNITED STATES PATENT AND TRADEMARK OFFICE
CERTIFICATE OF CORRECTION

PATENT NO. : 5,883,331
DATED : March 16, 1999
INVENTOR(S) : Kenneth H. Reiker

It is certified that error appears in the above-identified patent and that said Letters Patent is hereby corrected as shown below:

In the Claims:

25. A mounting assembly as define in Claim 1, wherein:
    a) said hole provided on said bottom plate is a threaded hole.

Signed and Sealed this

Twenty-third Day of May, 2000

Attest:

Q. TODD DICKINSON

Attesting Officer        Director of Patents and Trademarks